United States Patent
Hassan et al.

(10) Patent No.: US 7,874,006 B2
(45) Date of Patent: *Jan. 18, 2011

(54) PROVIDING GUEST USERS NETWORK ACCESS BASED ON INFORMATION READ FROM A MOBILE TELEPHONE OR OTHER OBJECT

(75) Inventors: Amer A. Hassan, Redmond, WA (US); Andrew Baron, Redmond, WA (US); Christian Huitema, Redmond, WA (US); Deyun Wu, Redmond, WA (US); Mahmood H. Khadeer, Redmond, WA (US); Vishesh M. Parikh, Redmond, WA (US); Wajih Yahyaoui, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 914 days.

This patent is subject to a terminal disclaimer.

(21) Appl. No.: 11/490,591

(22) Filed: Jul. 21, 2006

(65) Prior Publication Data

US 2007/0255837 A1     Nov. 1, 2007

Related U.S. Application Data

(63) Continuation of application No. 11/413,922, filed on Apr. 28, 2006.

(51) Int. Cl.
G06F 7/04 (2006.01)

(52) U.S. Cl. .............................. 726/26; 726/2; 713/164; 713/166

(58) Field of Classification Search ........................ None
See application file for complete search history.

(56) References Cited

U.S. PATENT DOCUMENTS 5,806,043 A    9/1998   Toader (Continued)

FOREIGN PATENT DOCUMENTS

| KR | 102003006304 A | 3/2005 |
| WO | WO 03075516 | 9/2003 |
| WO | WO 2004/095803 | 11/2004 |

OTHER PUBLICATIONS

International Search Report from corresponding International Application No. PCT/US2007/010570 filed Apr. 30, 2007.

(Continued)

*Primary Examiner*—Pramila Parthasarathy
(74) *Attorney, Agent, or Firm*—Wolf, Greenfield & Sacks, P.C.

(57) ABSTRACT

Guest user are enabled to access network resources through an enterprise network using a guest user account. A guest user account may be created for a guest for a limited time. Guest account credentials of the guest account may be provided to the guest to use the guest account using any of a variety of techniques described herein, for example, by scanning a guest access card, credit card or mobile telephone of guest user, and providing the guest account credentials to the user based on the information obtained. A guest access management server may be configured to generate and maintain guest accounts, authenticate guest users, and track and log guest activity. A VLAN technology may be used to separate guest traffic from host enterprise traffic on the host enterprise network. After a guest user is authenticated, communications to and from the guest user may be routed to a guest VLAN.

15 Claims, 5 Drawing Sheets

U.S. PATENT DOCUMENTS

| | | |
|---|---|---|
| 6,463,473 B1 | 10/2002 | Gubbi |
| 6,577,628 B1 | 6/2003 | Ilejza |
| 6,591,306 B1 | 7/2003 | Redlich |
| 6,792,474 B1 | 9/2004 | Hopprich |
| 7,130,904 B2 | 10/2006 | Kitchin |
| 2002/0010631 A1 | 1/2002 | Sato et al. |
| 2003/0120821 A1 | 6/2003 | Thermond |
| 2003/0217148 A1 | 11/2003 | Mullen et al. |
| 2003/0225765 A1 | 12/2003 | Frieden |
| 2004/0199768 A1 | 10/2004 | Nail |
| 2004/0210450 A1 | 10/2004 | Atencio |
| 2004/0221042 A1* | 11/2004 | Meier .................. 709/227 |
| 2004/0248557 A1 | 12/2004 | Muratsu |
| 2004/0268152 A1 | 12/2004 | Xia et al. |
| 2005/0138172 A1 | 6/2005 | Cromer |
| 2005/0198319 A1 | 9/2005 | Chan |
| 2005/0198534 A1 | 9/2005 | Matta |
| 2005/0228680 A1 | 10/2005 | Malik |
| 2005/0256958 A1 | 11/2005 | Wilson |
| 2006/0149967 A1 | 7/2006 | Lee et al. |
| 2007/0155418 A1* | 7/2007 | Shau et al. ............ 455/550.1 |
| 2007/0255838 A1 | 11/2007 | Hassan et al. |
| 2007/0256121 A1 | 11/2007 | Hassan et al. |

OTHER PUBLICATIONS

Kong et al. Escort: A Decentralized and Localized Access Control System for Mobile Wireless Access to Secured Domains. pp. 51-60.

Wireless Network: Access for Stanford Visitors. pp. 1-2.

Matsunaga, Y.; Merino, A.; Suzuki, T. and Katz, R., "Secure Authentication System for Public WLAN Roaming", Wireless Mobile Applications and Services on WLAN Hotspots Archive, Proceedings of the 1$^{st}$ ACM International Workshop on Wireless Mobile Applications and Services on WLAN Hotspots, pp. 113-121; Year of Publication: 2003; ACM Database.

Office Action mailed Jul. 6, 2009 from related U.S. Appl. No. 11/413,922.

Office Action mailed Dec. 29, 2008 from related U.S. Appl. No. 11/490,659.

Office Action mailed Jul. 14, 2009 from related U.S. Appl. No. 11/490,659.

Office Action mailed Dec. 30, 2009 from related U.S. Appl.No. 11/490,659.

Office Action mailed Jan. 12, 2010 from related U.S. Appl. No. 11/413,922.

Office Action mailed Jun. 22, 1010 from related U.S. Appl. No. 11/490,659.

* cited by examiner

PROVIDING GUEST USERS NETWORK ACCESS BASED ON INFORMATION READ FROM A MOBILE TELEPHONE OR OTHER OBJECT

RELATED APPLICATIONS

This application is a continuation of U.S. application Ser. No. 11/413,922, entitled, "Providing Guest Users Access to Network Resources Through an Enterprise Network," by Hassan et al, filed Apr. 28, 2006, the entire contents of which is hereby incorporated by reference.

BACKGROUND

In today's world, enterprises often serve as hosts to visitors, for example, vendors, partners, clients, members, colleagues, students, etc., for any of a variety of purposes. These guests often desire to access the Internet or another network (e.g., the networks of their own enterprises) using their mobile user devices, such as, for example, laptop computers, notebook computers, telephones, Blackberry™ brand devices, PCS devices, personal digital assistance (PDAs), etc. Thus, host enterprises often provide guests access to network resources through the host enterprise's network. As used herein, enterprises include, but are not limited to: companies; corporations; partnerships; sole proprietorships, other types of business entities; organizations; non-profit organizations; governmental bodies and/or agencies; educational institutions; other types of enterprises; and any suitable combination of the foregoing.

Providing guests access to network resources (e.g., a portion of the host network, the Internet, a guest enterprise network, etc.) often requires the use of dedicated hardware and/or software, and the installment and the maintenance of same. These dedicated solutions are not simple. Most require information technology (IT) support and/or the assistance of one or more administrators or receptionists. Thus, in order to provide guests with access to network resources, host enterprises typically incur the costs of dedicated hardware and/or software, IT support, and/or administrative assistance.

SUMMARY

This Summary provides an illustrative context for aspects of the invention, in a simplified form. It is not intended to be used to determine the scope of the claimed subject matter. Aspects of the invention are described more fully below in the Detailed Description.

Described herein are systems and methods enabling guests to access network resources through an enterprise network using a guest user account. A guest user account may be created for a guest for a limited time (a day, a couple days, certain times during certain days (e.g., 9:00 a.m. to 5:00 p.m.), a week, or even longer). Guest account credentials (e.g., a guest account ID and password) of the guest account may be provided to the guest, which allow the guest to use the guest account. Any of a variety of techniques, including those described herein, may be used to provide the guest account credentials to the user. Providing the credentials may involve obtaining information from the guest user, and providing guest access credentials in response to obtaining the information. Obtaining the information about the guest user may include scanning a guest access card, credit card or mobile telephone of the guest user, receiving an email or letter, or orally in person or by telephone. A guest access management server may be configured to generate and maintain guest accounts, authenticate guest users, and track and log guest activity.

In some embodiments, virtual LAN (i.e., VLAN) technology may be used to separate guest traffic from host enterprise traffic on the host enterprise network. By using VLAN technology, the host enterprise's existing network infrastructure may be used, as opposed to having to modify the infrastructure. After a guest user is authenticated, communications to and from the guest user may be routed to a guest VLAN. Within the guest VLAN, the user may be allowed to access network resources such as the Internet or the guest enterprise's network.

In an embodiment of the invention, a guest user to enabled to access network resources through an enterprise network. Information read from an object (e.g., a credit card, a guest access card, a mobile telephone, etc.) in the possession of the guest user is received. One or more guest account credentials for accessing the network resources through the enterprise network are determined based on the read information, and the one or more guest account credentials are indicated to the guest user.

In another embodiment, a system is provided for enabling a guest user to access network resources through an enterprise network. The system includes a guest access management server to determine, based on the information read from an object (e.g., a credit card, a guest access card, a mobile telephone, etc.) in the possession of the guest user, one or more guest account credentials for accessing the network resources through the enterprise network, and to initiate an indicating of the one or more guest account credentials to the guest user.

In yet another embodiment, a computer program product is provided, which includes a computer-readable medium and computer-readable signals stored on the computer-readable medium. The signals define instructions that, as a result of being executed by a computer, control the computer to perform a method of a method of enabling a guest user to access network resources through an enterprise network. The method includes acts of: (a) receiving information read from a guest access card of the guest user; (b) determining, based on the read information, one or more guest account credentials for accessing the network resources through the enterprise network; and (c) indicating the one or more guest account credentials to the guest user.

In another embodiment, a guest user is enabled to access network resources through an enterprise network. Information from a credit card vendor verifying an identity of the guest user is received. One or more guest account credentials for accessing the network resources through the enterprise network are determined based on the received information, and the one or more guest account credentials are indicated to the guest user.

In another embodiment, a system is provided for enabling a guest user access to network resources through an enterprise network. The system includes a guest access management server to receive information from a credit card vendor verifying an identity of the guest user, to determine, based on the received information, one or more guest account credentials for accessing the network resources through the enterprise network, and to initiate an indication of the one or more guest account credentials to the guest user.

In yet another embodiment, a user is enabled to access network resources through an enterprise network. At a server of a credit card vendor, information read from a credit card of the user by a credit card scanner on premises of the enterprise is received. An identity of the user is verified based on the received information, and verification information about the user is sent to a guest access server of the enterprise, the guest access server being responsible for guest user access to network resources through a network of the entity.

In another embodiment, system is provided to enable a guest user to access network resources through an enterprise network. The system includes a server of a credit card vendor, operative to receive information read from a credit card of the user by a credit card scanner on premises of the enterprise, to verify an identity of the user based on the received information, and to send verification information about the user to a guest access server of the enterprise, the guest access server being responsible for guest user access to network resources through a network of the enterprise.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

DETAILED DESCRIPTION

Figure 1:
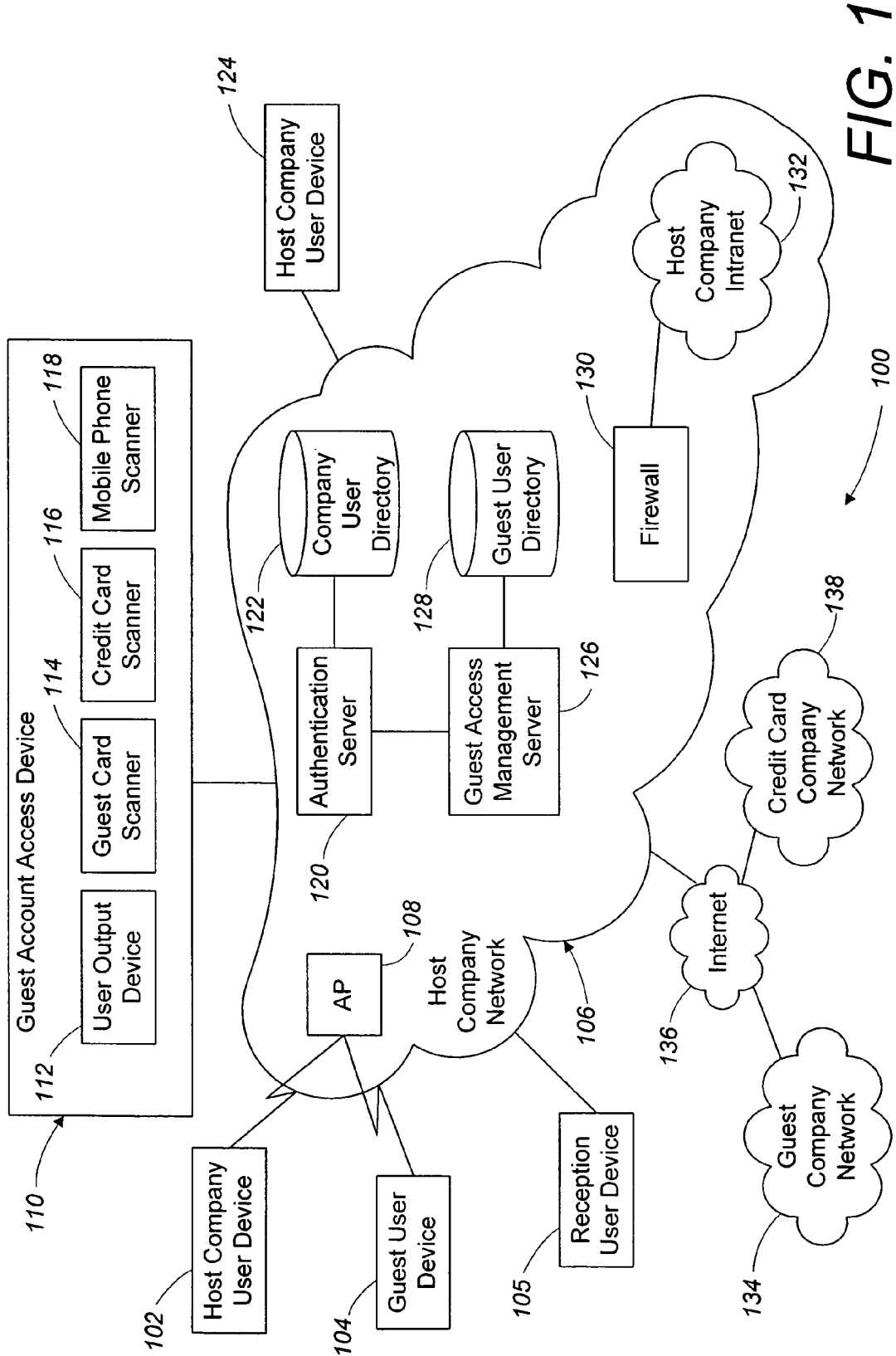
FIG. 1 is a block diagram illustrating an example of a system for enabling a guest user to access network resources through a host enterprise network, according to some embodiments of the invention.

Although embodiments of the invention are described below in relation to providing guest users wireless access to network resources through a host enterprise network, the invention is not so limited, but rather, may be implemented for non-wireless (e.g., wireline) access.

The function and advantage of the above embodiments and other embodiments of the present invention will be more fully understood from the examples described below. The following examples are intended to facilitate a better understanding and illustrate the benefits of the present invention, but do not exemplify the full scope of the invention.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03.

EXAMPLES

In some embodiments, a guest user is granted guest access through a host enterprise using a guest access card issued by the host enterprise. Prior to, or at the time of, the guest's arrival at the host enterprise, the guest may be provided a guest access card. The guest access card may encode (in clear text or encrypted form) guest account credentials for a guest account, such as, for example, a guest access ID and password, or may encode a value that is associated with a guest account and/or guest account credentials. Guest account credentials and/or other information may be stored on a magnetic strip or in semiconductor memory on the guest access card.

Upon arrival at the host enterprise (e.g., a lobby or reception area), the guest user may attempt to access network resources (e.g., the Internet and/or the guest's corporate network) using a user device (e.g., a laptop or PDA) and may be prompted for guest account credentials (e.g., a guest account ID and password). Prior to, during or after attempting to access network resources, the guest user may scan the guest access card (e.g., magnetically, optically or using RF technology) using a scanner on the host enterprise's premises (e.g., in a reception area or lobby), which may be specifically designed for this purpose. A guest access management server on the host network may receive the scanned information and determine guest account credentials. This determination may be made simply by reading the guest account credentials provided by the guest access card, by decrypting encrypted account information on the card or by mapping information provided by the card to a guest account ID and password. The guest account credentials may be sent to a device capable of indicating them to the guest user, for example, a device in the vicinity of the guest user and/or scanner. Such a device may be or include any of the following: a display device (e.g., a monitor); a printer; a device that produces badges and/or ID cards, a speaker; a telephone; another type of device; or any suitable combination of the foregoing.

The guest user then may log into the host enterprise network using the guest credentials, for example, using a user device (e.g., a laptop or PDA). The host enterprise network may be configured to limit guest user access, for example, to the Internet and/or the guest's enterprise network. For example, the host enterprise network may employ virtual local area network (VLAN) technologies to limit the guest's access based on the guest access account of the guest user. The host enterprise network then may monitor the network activity of the guest and, if necessary, bill the guest user for access to particular network resources such as, for example, the Internet.

Further, the guest account may be configured to have a limited duration such as, for example, a certain (e.g., predefined) number of hours, days, weeks, months, or a combination thereof. The guest account may further be configured for use only during specific times within the limited duration, for example, from 9:00 a.m. to 5:00 p.m. over a three-day duration.

In some embodiments of the invention, rather than using a guest access card issued by the host enterprise, the guest user may use a credit card issued by a credit card vendor such as, for example, Visa, MasterCard, American Express, Discover, etc., to obtain access to network resources through a host enterprise's network. Prior to, during or after attempting to access network resources using a laptop or other user device, the guest user may scan the credit card using a scanner on the host enterprise's premises. Information resulting from the scan may be sent to a network of the credit card enterprise, which may verify the identity of the guest user. The credit card enterprise then may send verification information about the guest user to the host enterprise network, for example, to a guest access management server on the host enterprise network. In response to receiving the verification information, a guest access management server may generate a guest account and guest account credentials, and send the credentials to a device that indicates (e.g., displays) them to the guest user (e.g., as described above). The guest user can then use the credentials to log into the host enterprise network. The guest's access to network resources may be limited and the guest's activity may be monitored and billed, for example, as described above. Further, the duration and specific times of access using the guest account also may be limited.

In some embodiments, rather than using a guest access card or existing credit card, the guest user may use a mobile telephone to obtain access to network resources through a host enterprise's network. Using a mobile telephone scanner provided on the host enterprise's site, the guest user may scan information stored on the guest's mobile telephone, for example, on a subscriber identity module (SIM) card of the mobile telephone. This information may be sent to the guest access management server, which may generate a guest account and guest account credentials in response to receiving the scanned information. The guest account credentials may be sent to a device and indicated (e.g., displayed) to the user, for example, as described above. Using a laptop or other user device, the guest user then may access the network resources through the host enterprise network by entering the guest credentials. Similar to as described above, the guest user's access may be limited to certain network resources, and to a certain duration and specific times within the duration, and the activities of the guest user may be monitored and billed as appropriate.

In some embodiments, a guest user may be provided guest account credentials before arriving at the host enterprise, or a receptionist or another administrator at the guest enterprise may provide the guest account credentials to the guest user upon the guest's arrival. In such embodiments, the guest user may simply log into the network using the guest account credentials without having to first scan a guest card, credit card, mobile telephone or other item.

FIG. 1 is a block diagram illustrating an example of a system 100 for enabling a guest user to access network resources through a host enterprise network, according to some embodiments of the invention. System 100 is merely an illustrative embodiment of a system for enabling a guest user to access network resources through a host enterprise network, and is not intended to limit the scope of the invention. Any of numerous of implementation to such a system, for example, variations of system 100, are possible and are intended to fall within the scope of the invention.

System 100 may include any of: one or more host enterprise user devices (e.g., 102 and 124); one or more guest user devices (e.g., 104); one or more reception user devices (e.g., 105); one or more guest account access devices (e.g., 110); a host enterprise network 106; the Internet 136; one or more guest enterprise networks (e.g., 134); one or more credit card enterprise networks (e.g., 138); and any suitable combination of the foregoing.

As used herein, a "network" is a group of two or more components interconnected by one or more segments of transmission media over which communications may be exchanged between the components. Each segment may be any of a plurality of types of transmission media, including one or more electrical or optical wires or cables made of metal and/or optical fiber, air (e.g., using wireless transmission over carrier waves) or any combination of these transmission media. As used herein, "plurality" means two or more. It should be appreciated that a network may be as simple as two components connected by a single wire, bus, wireless connection, or other type of segment. Further, it should be appreciated that when a network is illustrated in a drawing of this application as being connected to an element in the drawing, the connected element itself is considered part of the network.

As used herein, a "network device" is a device operative to communicate on a network, including, but not limited to: workstations, personal computers, terminals, laptop computers, end stations, user devices, servers, gateways, registers, switches, routers, hubs, bridges, directories, transmitters, receivers, transceivers, wireless access points (APs), repeaters, and any combinations thereof. As used herein, a "user device" is a network device from/to which a user may send/receive communications, and which may serve as an endpoint to communications on a communications network. User devices include, but are not limited to: workstations; personal computers (e.g., PCs); laptop computers, notebook computers; telephones (e.g., landline or mobile); pagers; Blackberry™ brand devices, PCS devices, personal digital assistants (PDAs), smartphones, two-way radios (e.g., "walkie-talkies"), other types of user devices, and any suitable combination of the foregoing.

A network (e.g., any of networks 106, 132, 134, 136 and 138) may be or include any of a variety of types of networks including, but not limited to, a local area network (LAN), a metropolitan area network (MAN), a wide-area network (WAN), a wireless network, a Public Land Mobile Network (PLMN), a Global System for Mobile Communications (GSM) network, a General Packet Radio Service (GPRS) network, a Universal Mobile Telecommunications System (UMTS) network, a Code-Division Multiple Access (CDMA) network, an optical network, a data network, an enterprise-wide network, a wireless personal area network (PAN), a home network, a telecommunications network, a public switched telephone network (PSTN), a broadband network, another type of network, or any suitable combination of the foregoing.

Host enterprise network 106 may include one or more network devices of any of the types described above and may include any of: one or more wireless access points (APs) (e.g., 108), one or more authentication servers (e.g., 120); one or more enterprise user directories (e.g., 122); one or more guest access management servers (e.g., 126); one or more guest user directories (e.g., 128); one or more firewalls (e.g., 130); a host enterprise Intranet (132); other network devices; or any suitable combination of the foregoing.

One or more components of host enterprise network 106 such as, for example, routers, switches and/or combination thereof (not shown) may be configured to define one or more VLANs. One or more of these VLANs (i.e., a guest VLAN) may be defined to include one or more guest access accounts and one or more network resources. The one or more network resources included within a guest VLAN may include the Internet, a guest enterprise network and perhaps one or more network resources residing on host network 106, so that guest users are limited to accessing only these resources. One or more other VLANs may be associated with host enterprise users (e.g., employees and officers). These host enterprise VLANs should be defined to include more resources on host enterprise network 106 than guest VLANs, thus providing enterprise users access to more resources on the enterprise network than guest users, who may be given access to no resources on the enterprise network. For example, the host enterprise VLAN may be configured to include host enterprise Intranet 132.

AP 108 may be configured to provide wireless access to host enterprise network 106 for user devices, including host enterprise user devices (e.g., 102 and 124) and guest user devices (e.g., 104). AP 108 may be configured to pass user credentials received from a user device to authentication server 120. Authentication server 120 may be configured to determine whether the user credentials identify a host enterprise user, for example, by accessing enterprise user directory 122. If the user credentials identify a user as an authorized user of a host enterprise, the user may be given access to resources of host enterprise network 106, according to one or more VLANs to which the user belongs.

If the authentication server 120 determines that user credentials provided by a user device are not those of a host enterprise user, the authentication server 120 may pass the user credentials to guest access management server 126. Alternatively, server 126 may receive the credentials from AP 108 without first going through authentication server 120. Server 126 may determine whether the user credentials identify a guest user, for example, by accessing guest user directory 128. If the user credentials identify the user as a guest user, the guest user may be provided access only to those network resources to which members of the guest VLAN are permitted access.

In some embodiments of the invention, a user device (e.g., any of 102, 104 or 124) may be configured to discover any networks in the vicinity of the user device, for example, by establishing communications with an AP in the vicinity of the user device. For example, a user device may include an operating system (e.g., one of the operating systems available from Microsoft Corporation, specified below) configured to discover networks in its vicinity, e.g., in response to the operating system being launched when the user device is booted (i.e., powered on). If the user device is a host enterprise user device (e.g., 102), then the user device may be permitted to exchange information with host enterprise network 106 based on previous communications exchanged between the user device and an AP. For example, the operating system of the host enterprise user device may automatically provide user credentials previously exchanged between the user device and the AP to establish connectivity.

The AP and/or the guest user device may be configured to recognize when a guest user device has not previously been authenticated. In such cases, the operating system of the guest user device may be configured to prompt the user for guest account credentials (i.e., a guest account ID and a password). The guest user device may only be permitted access to the host enterprise network by providing valid guest user credentials.

In some embodiments of the invention, the user of the guest user device may be provided guest account credentials prior to arriving on the premises of the host enterprise (e.g., by email, paper mail, telephone, etc.), or upon arrival on the premises by a receptionist or other administrator. For example, upon arrival, a receptionist or other administrator may use reception user device 105 to contact guest access management server 106 to obtain guest account credentials.

Obtaining guest account credentials prior to arrival on the enterprise premises may be desirable when a large amount of guest users will be visiting the host enterprise. In such situations, an IT staff or administrator from the host enterprise can use the guest access management server 126 to import information for all of the guests who will be visiting the host enterprise. Such information may include names, job titles, the length of time for which guest access will be necessary, etc. The guest access management server 126 may provide different guest account credentials for each future guest. Upon arrival on the host enterprise premises, each guest user may log onto the host enterprise network 106 through AP 108 or another access point, using the previously provided guest account credentials. The guest access management server 126 then may authenticate each of the guest users, for example, by comparing the user credentials provided with those stored in guest user directory 128.

In some embodiments of the invention, guest users acquire guest user credentials after they arrive on the host enterprise premises, for example, through the use of a guest account access device such as device 110. Device 110 may include any of: user output device 112; guest card scanner 114; credit card scanner 116; mobile telephone scanner 118; other components; and any suitable combination of the foregoing. It should be appreciated that one or more of user output device 112, guest card scanner 114, credit card scanner 116 and mobile telephone scanner 118 may reside on separate guest account access devices, and that one or more of these components may be integrated as a single component.

User output device 112 may include one or more of any type of output device suitable to display information to a user, for example, a monitor, printer or badge-generating device, or to indicate information to the user in some other manner (e.g., through audio), for example, a speaker or telephone. It should be appreciated that user output device 112 is not limited to being part of guest account access device 110, but may be separate and distinct from device 112.

Guest card scanner 114 may be configured to scan a guest card provided by a guest user. A guest card may have guest account credentials, or a value mapping to an account encoded thereon, for example, in clear text or encrypted format. The guest access card may store information on a magnetic strip, a semiconductor memory or on some other form of media. Further, the guest access card may include a transmitter or other means for transmitting/receiving signals and/or information. The guest access card scanner 114 may be configured with one or more components (e.g., heads) to read magnetically-stored information and/or with a receiver or transceiver for receiving information transmitted from a guest card. Further, scanner 114 may be configured to send information scanned from a guest access card to guest access management server 126, for example, across one or more segments of host enterprise network 106.

Credit card scanner 116 may be configured with one or more components (e.g., heads) to scan a credit card and send the scanned information to the appropriate credit card enterprise network (e.g., 138) and/or a component of host enterprise network 106 (e.g., guest access management server 126) configured to send the information along to the credit card enterprise network 138.

In some embodiments of the invention, the host enterprise has a partnership with one or more credit card enterprises. The host enterprise may pay a certain amount of money for each enterprise's validation service. If the host enterprise needs to charge the guest access, a credit card enterprise can charge for access on the credit card.

It should be appreciated that, in some embodiments, scanners 114 and 116 may be integrated as part of a same device, and the same components may be used to read information from guest access cards and credit cards. In such embodiments, the scanning device may be configured to determine from the scanned information (e.g., its format and/or content) whether the card scanned is a credit card or a guest access card, and to proceed accordingly. For example, the scanning device may send the scanned information to the guest access management server 126 if it determines the card scanned is a guest access card, and may send the scanned information to the appropriate credit card vendor otherwise.

Mobile telephone scanner 118 may be configured to read information about a mobile telephone user from a guest user's mobile telephone, for example, from a SIM card of a user's mobile telephone. The mobile telephone scanner 118 may be configured to read this information electromagnetically and/or optically from the mobile telephone, and to send the information about the user to the guest access management server 126.

Guest access management server 126 may be configured to receive: guest account credentials (e.g., a guest account ID and password) in clear text or encrypted form; information corresponding to guest account credentials; information corresponding to a user, other information, or any suitable combination of the foregoing. In response to receiving such information, server 126 may determine guest account credentials and provide them to one or more other network components such as, for example, user output device 112. For example, guest access management server 126 may be configured to receive verification information about a user from credit enterprise network 138, information about a mobile telephone user from mobile telephone scanner 118 and/or guest account credentials for information corresponding to guest account credentials from guest card scanner 114.

Server 126 may be configured to determine guest account credentials included in information it receives (e.g., from guest card scanner 114) and/or create guest account credentials in response to user information or user verification information it receives from mobile telephone scanner 118 and credit card enterprise network 138, respectively. The guest access management server 126 may store guest account credentials in guest user directory 128, and use these credentials to authenticate guest users.

System 100, and components thereof, may be implemented using any of a variety of technologies, including software (e.g., C, C#, C++, Java, or a combination thereof), hardware (e.g., one or more application-specific integrated circuits), firmware (e.g., electrically-programmed memory) or any combination thereof. One or more of the components of system 100 may reside on a single device (e.g., a computer), or one or more components may reside on separate, discrete devices. Further, each component may be distributed across multiple devices, and one or more of the devices may be interconnected.

Further, on each of the one or more devices that include one or more components of system 100, each of the components may reside in one or more locations on the system. For example, different portions of the components of these systems may reside in different areas of memory (e.g., RAM, ROM, disk, etc.) on the device. Each of such one or more devices may include, among other components, a plurality of known components such as one or more processors, a memory system, a disk storage system, one or more network interfaces, and one or more busses or other internal communication links interconnecting the various components. System 100, and components thereof, may be implemented using a computer system such as that described below in relation to FIGS. 6 and 7.

Figure 2:
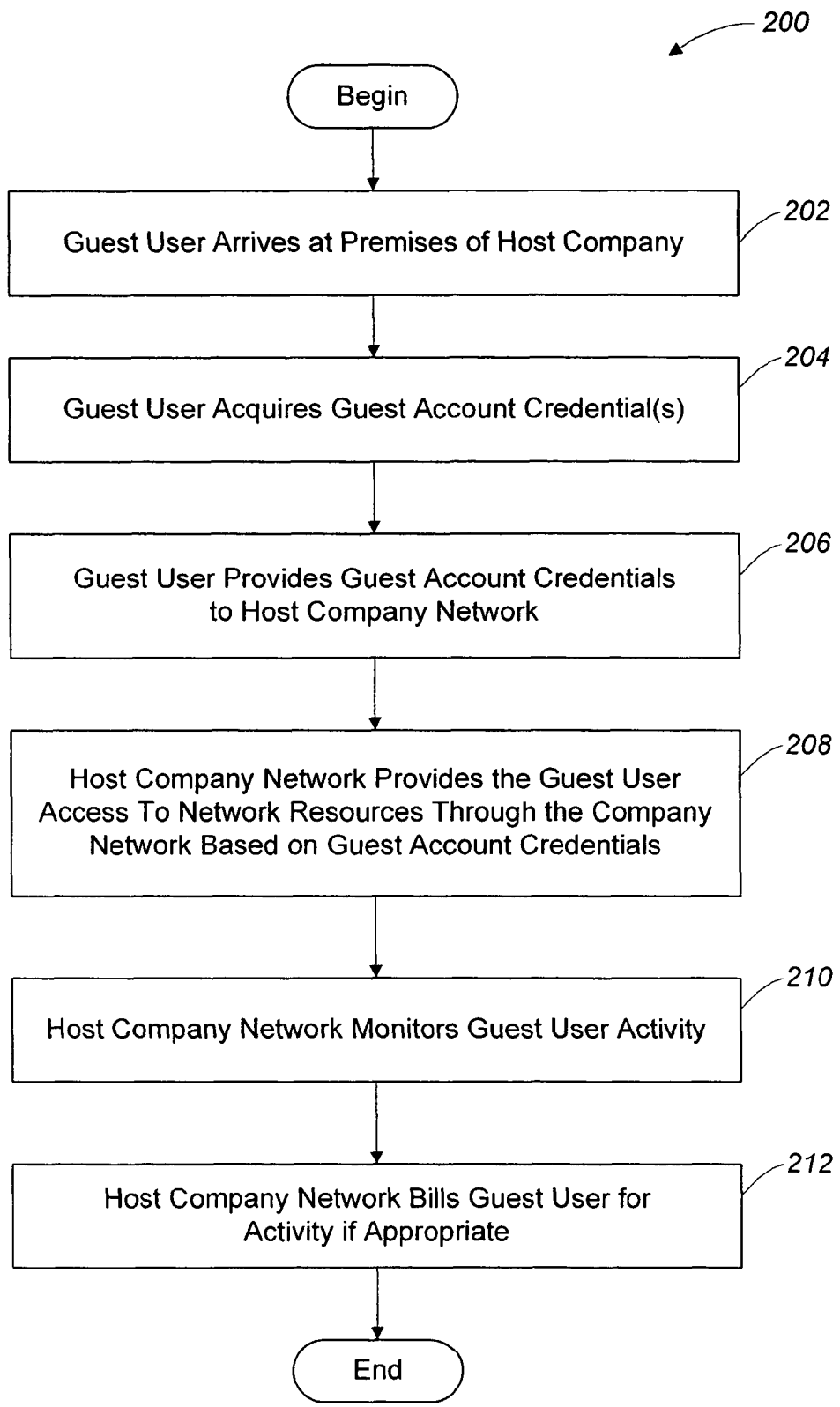
FIG. 2 is a flow chart illustrating an example of a method of enabling a guest user to access network resources through an enterprise network, according to some embodiments of the invention.

FIG. 2 is a flow chart illustrating an example of a method 200 of enabling a guest user (e.g., a user of guest user device 104) to access network resources through an enterprise network (e.g., network 106), according to some embodiments of the invention. Method 200 is merely an illustrative embodiment of a method of enabling a guest user to access network resources through an enterprise network, and is not intended to limit the scope of the invention. Any of numerous other implementations of such a method, for example, variations of method 200, are possible and are intended to fall within the scope of the invention.

In Act 202, a guest user arrives at the premises of an enterprise, for example, in the reception area or a lobby of the enterprise offices. In Act 204, the user may acquire one or more guest account credentials, for example, as described below in relation to FIGS. 3-5. It should be appreciated that, in some embodiments, the guest account credentials may be acquired before the guest user arrives on the premises of the host enterprise, as described above.

In Act 206, the guest user may provide the guest account credentials to an enterprise network. For example, the guest user may enter the guest account credentials through a user device (e.g., device 105), for example, in response to prompts. These guest account credentials may be passed to an authentication component of the network such as, for example, guest access management server 126.

In Act 208, the enterprise network may provide the guest user access to network resources through the enterprise network based on the guest account credentials. For example, the guest account credentials may be passed to the guest access management server 126, which may verify the credentials using guest user directory 128. If the guest account credentials are authenticated, the guest may be provided access to network resources such as, for example, the Internet 136, the guest enterprise network 134, and perhaps resources on host enterprise network 106 itself. Access to these network resources may be regulated using VLAN technologies. That is, one or more VLANs may be defined that include the Internet and the guest enterprise network, a limited amount of resources of network 106, and/or one or more guest accounts. One or more components on host enterprise network 106 (e.g., routers, switches, or suitable combinations thereof) may be configured to control access to network resources defined for one or more such VLANs based on the guest account ID provided by a guest user. Other technologies may be used to regulate guest user access.

In Act 210, the host enterprise network may monitor activities of the guest user, for example, the network resources that it accesses and/or with which it exchanges communications. In Act 212, the host enterprise network may bill the guest user for certain activities, for example, accessing particular network resources such as, for example, Internet.

The guest account provided for the guest user may be configured to be of limited duration and for use only during specific times during this duration. For example, the user account may be configured to be for use during a three day period (e.g., Monday-Wednesday) only during business hours, e.g., 9:00 am-5:00 pm. Accordingly, the guest management access server and the network components responsible for routing traffic on the host enterprise network may be configured to deny access to the guest user when the duration of the guest account expires and when the guest user attempts to access network resources outside of the specific times designated for guest access. The guest access management server and these other components may be configured to do so based on the guest account credentials provided by the guest user when logging in and/or when transmitting packets on the guest enterprise network. An entry (e.g. record) for the guest account in guest user directory 128 may include one or more information elements that specify the duration and/or specific access times for a guest access account.

Method 200 may include additional acts. Further, the order of the acts performed as part of method 200 is not limited to the order illustrated in FIG. 2, as the acts may be performed in other orders and/or one or more of the acts may be performed in series or in parallel, at least partially. For example, Act 204 may be performed before Act 202 and Acts 210 and 212 may be performed in parallel, at least partially.

Figure 3:
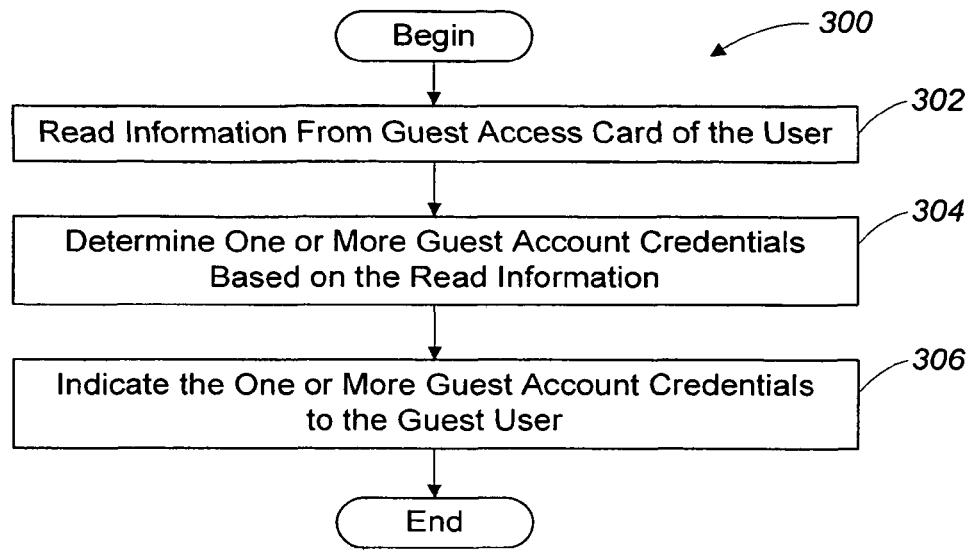
FIG. 3 is a flowchart illustrating an example of a method of enabling a guest user to access network resources through an enterprise network using a guest access card, according to some embodiments of the invention.

FIG. 3 is a flowchart illustrating an example of a method 300 of enabling a guest user to access network resources through an enterprise network using a guest access card, according to some embodiments of the invention. Method 300 is merely an illustrative embodiment of a method of enabling a user to access network resources through an enterprise network using a guest access card, and is not intended to limit the scope of the invention. Other implementations of such a method, for example, variations of method 300, are possible and are intended to fall within the scope of the invention.

In Act 302, information may be read from a guest access card of the user, for example, as described above in relation to guest card scanner 114. Next, in Act 304, based on the information read from the guest access card, one or more guest account credentials may be determined, for example, as described above in relation to guest access management server 126. In Act 306, the one or more guest account credentials may be indicated (e.g., displayed or played as audio) to the guest user, for example, as described above in relation to user output device 112. Method 300 may include additional acts.

Figure 4:
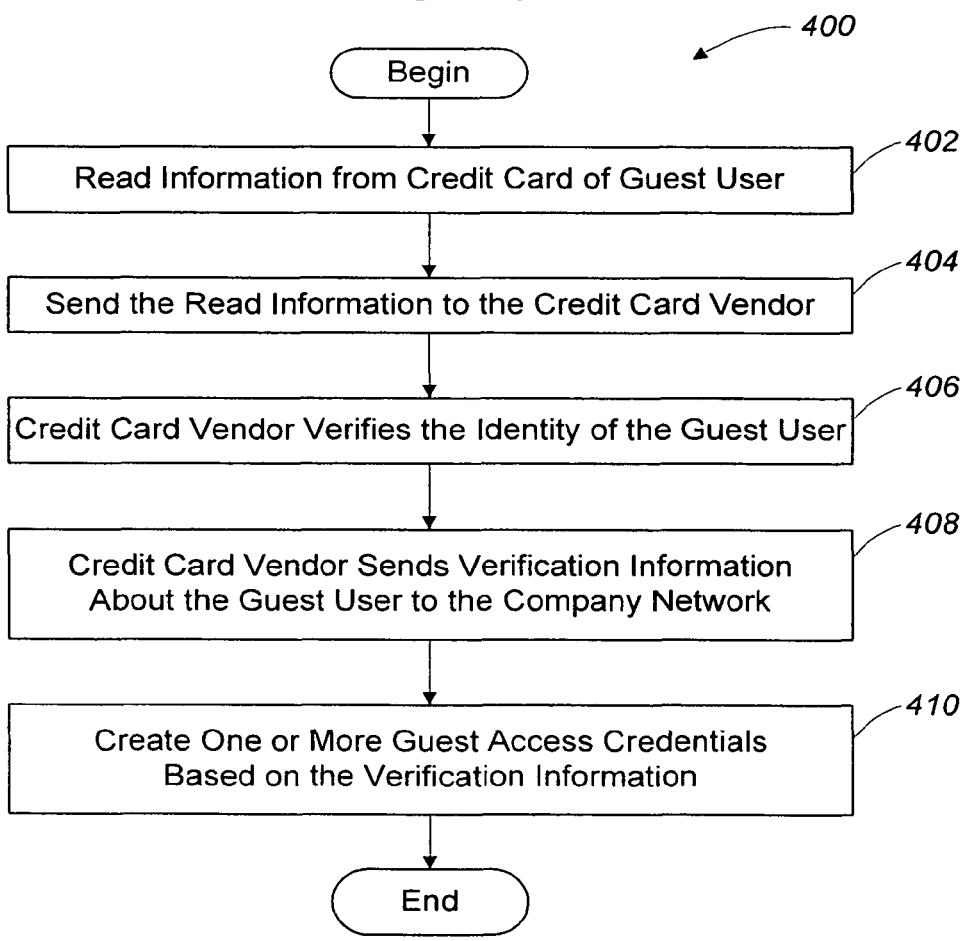
FIG. 4 is a flowchart illustrating an example of a method of enabling a user to access network resource through an enterprise network using a credit card, according to some embodiments of the invention.

FIG. 4 is a flowchart illustrating an example of a method 400 of enabling a user to access network resources through an enterprise network using a credit card, according to some embodiments of the invention. Method 400 is merely an illustrative embodiment of a method of enabling a user to access network resources through an enterprise network using a credit card, and is not intended to limit the scope of the invention. Other implementations of such a method, for example, variations of method 400 are possible and are intended to fall within the scope of the invention.

In Act 402, information may be read from the credit card of the guest user, for example, as described above in relation to credit card scanner 116. In Act 404, the information read from the credit card may be sent to the credit card vendor, for example, credit card enterprise network 138 as described above, and the credit card enterprise may verify the identify of the guest user in Act 406. In Act 408, the credit card vendor may send verification information about the guest user to the enterprise network, for example, to guest access management server 126 as described above. In Act 410, one or more guest account credentials may be created based on the verification information, for example, as described above in relation to guest access management server 126. Method 400 may include additional acts.

Figure 5:
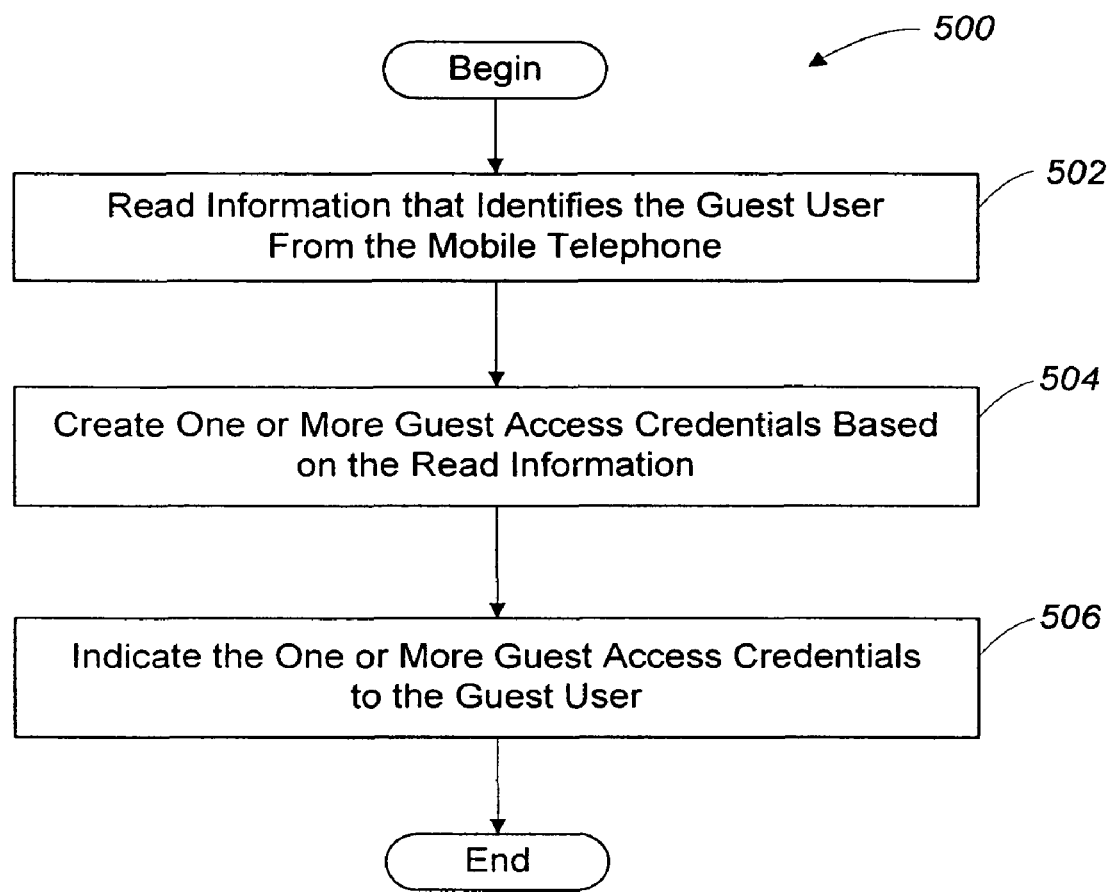
FIG. 5 is a flowchart illustrating an example of a method of providing a user access to network resources through an enterprise network using a mobile telephone, according to some embodiments of the invention.

FIG. 5 is a flowchart illustrating an example of a method 500 of providing a user access to network resources through an enterprise network using a mobile telephone, according to some embodiments of the invention. Method 500 is merely an illustrative embodiment of a method of providing a user access to network resources through an enterprise network using a mobile telephone, and is not intended to limit the scope of the invention. Other implementations of such a method, for example, variations of method 500 are possible and are intended to fall within the scope of the invention.

In Act 502, information that identifies the guest user is read from the mobile telephone, for example, from the SIM of the mobile telephone, e.g., as described above in relation to mobile telephone scanner 118. In Act 504, one or more guest account credentials may be created based on the information read from the mobile telephone, for example, as described above in relation to guest access management server 126. In Act 506, the one or more guest account credentials may be indicated (e.g., displayed or played as audio) to the guest user, for example, as described above in relation to user output device 112. Method 500 may include additional acts.

The embodiments described herein for providing guest users network access are relatively simple and secure. Each meets the market demands of providing easy Internet access to partners, customers, vendors and other enterprise visitors. These solutions may be cost saving, and add less overhead to an enterprise's IT department than known solutions because they use existing network infrastructure. The IT department may only need to maintain a guest VLAN instead of adding a new guest network infrastructure. Further, guest traffic and employee traffic may be separated. Also, guest activities may be logged and monitored, providing a relatively secure solution for the host enterprise. Several of the embodiments described herein provide easy billing mechanisms, and enterprises may be willing to deploy these solutions.

Methods 200-500, and acts thereof, and various embodiments and variations of these methods and these acts, individually or in combination, may be defined by computer-readable signals tangibly embodied on one or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (e.g., methods 200-500 or any acts thereof), and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems 100, 600 and 600 described herein, may be distributed across one or more of such components, and may be in transition therebetween.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Figure 6:
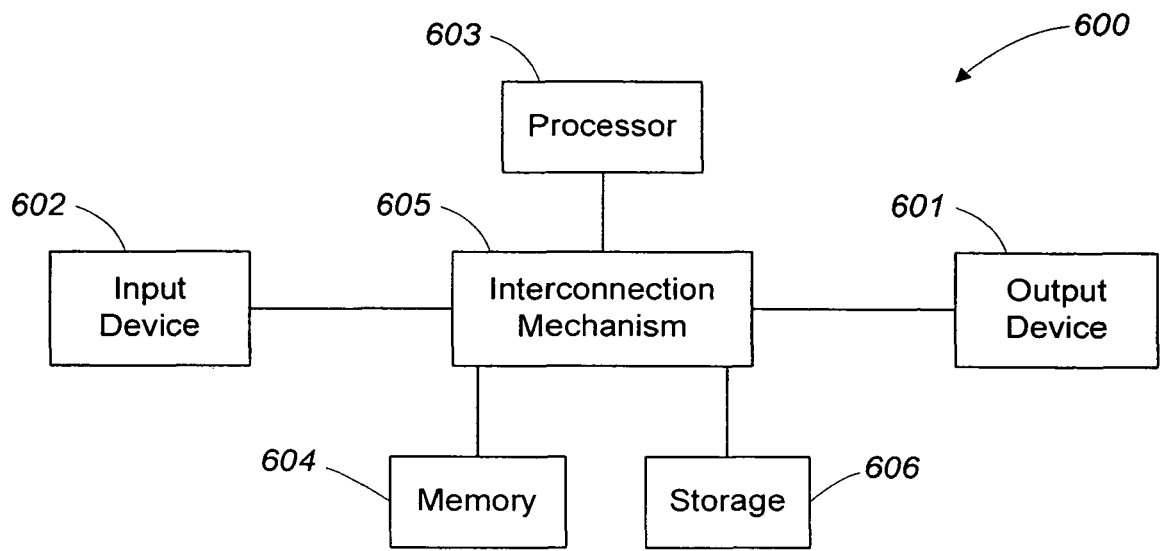
FIG. 6 is a block diagram illustrating an example of a computer system on which some embodiments of the invention may be implemented.
Figure 7:
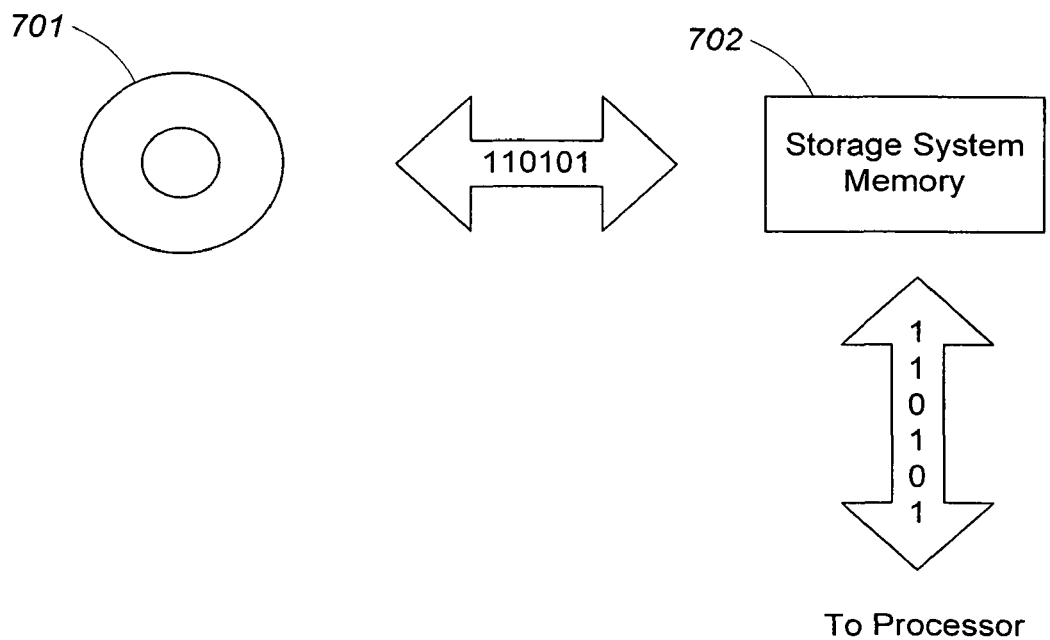
FIG. 7 is a block diagram illustrating an example of a storage system that may be used as part of the computer system to implement some embodiments of the invention.

It should be appreciated that any single component or collection of multiple components of a computer system, for example, any of the computer systems described in relation to FIGS. 1, 6 and 7, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

A general-purpose computer system according to one embodiment of the invention is configured to perform one or more of the functions described above. It should be appreciated that the system may perform other functions and the invention is not limited to having any particular function or set of functions.

For example, various aspects of the invention may be implemented as specialized software executing in a general-purpose computer system 600 such as that shown in FIG. 6. The computer system 600 may include a processor 603 connected to one or more memory devices 604, such as a disk drive, memory, or other device for storing data. Memory 604 is typically used for storing programs and data during operation of the computer system 600. Components of computer system 600 may be coupled by an interconnection mechanism 605, which may include one or more busses (e.g., between components that are integrated within a same machine) and/or a network (e.g., between components that reside on separate discrete machines). The interconnection mechanism 605 enables communications (e.g., data, instructions) to be exchanged between system components of system 600. Computer system 600 also includes one or more input devices 602, for example, a keyboard, mouse, trackball, microphone, touch screen, and one or more output devices 601, for example, a printing device, display screen, speaker. In addition, computer system 600 may contain one or more interfaces (not shown) that connect computer system 600 to a communication network (in addition or as an alternative to the interconnection mechanism 605).

The storage system 706, shown in greater detail in FIG. 6, typically includes a computer readable and writeable non-volatile recording medium 701 in which signals are stored that define a program to be executed by the processor or information stored on or in the medium 701 to be processed by the program. The medium may, for example, be a disk or flash memory. Typically, in operation, the processor causes data to be read from the nonvolatile recording medium 701 into another memory 702 that allows for faster access to the information by the processor than does the medium 701. This memory 702 is typically a volatile, random access memory such as a dynamic random access memory (DRAM) or static memory (SRAM). It may be located in storage system 606, as shown, or in memory system 604, not shown. The processor 603 generally manipulates the data within the integrated circuit memory 604, 702 and then copies the data to the medium 701 after processing is completed. A variety of mechanisms are known for managing data movement between the medium 701 and the integrated circuit memory element 604, 702, and the invention is not limited thereto. The invention is not limited to a particular memory system 604 or storage system 606.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 600 is shown by way of example as one type of computer system upon which various aspects of the invention may be practiced, it should be appreciated that aspects of the invention are not limited to being implemented on the computer system shown in FIG. 6. Various aspects of the invention may be practiced on one or more computers having a different architecture or components that that shown in FIG. 6.

Computer system 600 may be a general-purpose computer system that is programmable using a high-level computer programming language. Computer system 600 also may be implemented using specially-programmed, special-purpose hardware. In computer system 600, processor 603 is typically a commercially available processor such as the well-known Pentium class processor available from the Intel Corporation. Many other processors are available. Such a processor usually executes an operating system which may be, for example, the Windows® 95, Windows® 98, Windows NT®, Windows® 2000 (Windows® ME) or Windows® XP operating systems available from the Microsoft Corporation, MAC OS System X available from Apple Computer, the Solaris Operating System available from Sun Microsystems, Linux available from various sources or UNIX available from various sources. Any of a variety of other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system, and that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems, and that the invention is not limited to any particular distributed architecture, network, or communication protocol.

Various embodiments of the present invention may be programmed using an object-oriented programming language, such as SmallTalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Further, various embodiments of the invention may be implemented using Microsoft®.NET technology available from Microsoft Corporation.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of enabling a guest user to access network resources through an enterprise network, comprising:
   receiving, by a guest access management server of the enterprise network, information from a mobile telephone that identifies the guest user, wherein receiving information comprises receiving information from a subscriber identity module of the mobile telephone;
   determining, by the guest access management server, one or more guest account credentials based on the read information;
   verifying, by the guest access management server, the guest account credentials of the guest user;
   establishing, by the guest access management server, a guest virtual LAN that allows access by the guest user to specified resources of the enterprise network and separates guest traffic from enterprise traffic on the enterprise network; and
   after verifying the guest account credentials of the guest user, the guest management access server enabling guest user access to the specified resources of the enterprise network included in the guest virtual LAN.

2. The method of claim 1, further comprising:
   receiving the one or more guest account credentials from a user device of the guest user; and
   providing the user access to network resources based on the one or more guest account credentials.

3. The method of claim 2, wherein the enterprise network is configured to define a plurality of virtual local area networks, including a first virtual local area network for guest users, and
   wherein enabling guest user access comprises providing the guest user access to only network resources defined as part of the first virtual local area network.

4. The method of claim 3, wherein the first virtual local area network is defined to include the Internet.

5. The method of claim 1, wherein determining one or more guest account credentials comprises determining a guest account identity and password based on the received information, and
   wherein verifying the guest account credentials comprises verifying the guest account identity and password.

6. The method of claim 1, further comprising displaying the one or more guest account credentials to the guest user.

7. A computer-readable memory storage medium encoded with computer-readable instructions that, as a result of being executed by a computer, control the computer to perform a method of enabling a guest user to access network resources through an enterprise network, comprising acts of:
   receiving, by a guest access management server of the enterprise network, information read from a mobile telephone that identifies the guest user, wherein receiving information comprises receiving information from a subscriber identity module of the mobile telephone;
   determining, by the guest access management server, based on the received information, one or more guest account credentials of the guest user;
   verifying, by the guest access management server, the guest account credentials of the guest user;
   establishing, by the guest access management server, a guest virtual LAN that allows access by the guest user to specified resources of the enterprise network and separates guest traffic from enterprise traffic on the enterprise network; and
   after verifying the guest account credentials of the guest user, the guest management access server enabling guest user access to the specified resources of the enterprise network included in the guest virtual LAN.

8. The computer-readable memory storage medium of claim 7, wherein the method further comprises acts of:
receiving the one or more guest account credentials from a user device of the guest user; and
providing the guest user access to the network resources through the enterprise network based on the one or more guest account credentials.

9. A computer-readable memory storage medium of claim 8, wherein a guest account corresponding to the guest account credentials is configured to have a duration of a limited time, wherein the method further comprises:
denying the guest user access to the network resources after an expiration of the limited time.

10. A computer-readable memory storage medium of claim 8, wherein a guest account corresponding to the guest account credentials is configured to allow the guest user access to network resources only during one or more specific time intervals, wherein the method further comprises an act of:
denying the guest user access to the network resources outside of the one or more specific time intervals.

11. A computer-readable memory storage medium of claim 8, wherein the enterprise network is configured to define a plurality of virtual vocal area networks, including a first virtual local area network for guest users, and
wherein enabling guest user access comprises providing the guest user access to only network resources defined as part of the first virtual local area network, which includes the Internet.

12. A system for enabling a guest user to access network resources through an enterprise network, comprising:
a guest access management server to determine guest account credentials of the guest user based on information received from a mobile telephone, wherein the received information comprises receiving information from a subscriber identity module of the mobile telephone, to verify the guest account credentials of the guest user, to establish a guest virtual LAN that allows access by the guest user to specified resources of the enterprise network and separates guest traffic from enterprise traffic on the enterprise network, and, after verifying the guest account credentials of the guest user, to enable guest user access to the specified resources of the enterprise network included in the guest virtual LAN.

13. The system of claim 12 wherein the guest access management server is operative to determine, based on the received information, one or more guest account credentials for accessing the network resources through the enterprise network, wherein the system further comprises:
a user output device to indicate the one or more guest account credentials to the guest user.

14. The system of claim 12, wherein the guest access management server is operative to receive the one or more guest account credentials from the mobile telephone of the guest user, the guest account credentials determined from the information received from the mobile telephone, and to control providing the guest user access to the network resources through the enterprise network based on the one or more guest account credentials.

15. The method of claim 14, wherein the enterprise network is configured to define a plurality of virtual local area networks, including a first virtual local area network for guest users, and
wherein the guest access management server is operative to control providing the guest user access to only network resources defined as part of the first virtual local area network, which includes the Internet.

* * * * *